Nov. 29, 1932.   A. L. BROWNE   1,889,311
AUTOMATIC VALVE
Filed April 14, 1930
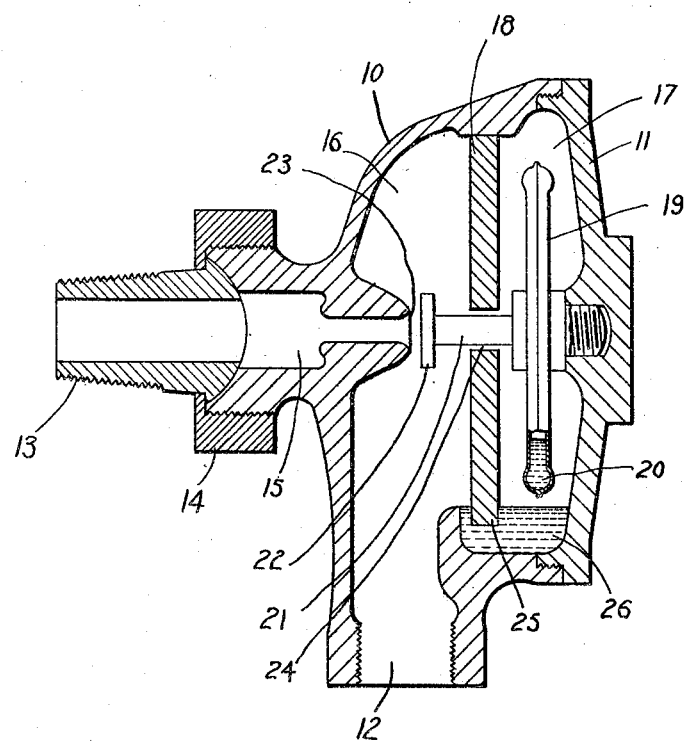
Inventor
Alfred L. Browne
By his Attorneys
Cooper Kerr and Dunham Patented Nov. 29, 1932

1,889,311

UNITED STATES PATENT OFFICE

ALFRED L. BROWNE, OF SOUTH ORANGE, NEW JERSEY

AUTOMATIC VALVE

Application filed April 14, 1930. Serial No. 444,010.

This invention relates to automatic valves. More particularly it relates to trap valves of the thermostat type and has for its purpose to provide improvements in that type of valves.

Radiators used for heating purposes are and have been supplied with return pipes through which air and water of condensation (i. e. condensate) are adapted to be conveyed from the radiators. Traps including thermostatically controlled valves are and have been employed between the radiators and their return pipes for the purpose of automatically controlling communication between each radiator and the return pipe. The ideal intended operation of such traps is that the thermostat shall automatically cause its valve to open to permit the escape of air and condensate from the radiator, to which the trap is connected, into the return pipe, and that the thermostat shall automatically cause its valve automatically to close to prevent escape of steam from the radiator.

Traps of the class referred to are of two general classes: So-called inboard traps and outboard traps. An inboard trap has its thermostat located on the radiator side of the valve which it controls; the thermostat being located in a chamber at all times in communication with the radiator whether the valve controlled by the thermostat and controlling communication between the radiator and return pipe is open or closed. An outboard trap has its thermostat located on the return pipe side of the valve which it controls; the thermostat being located in a chamber at all times in communication with the return pipe whether the valve controlled by the thermostat and controlling communication between the radiator and return pipe, is open or closed. Each of these types of traps has its particular advantage; neither gives ideal operation.

One of the objects of the present invention is to effect improvements on both the inboard and outboard types of traps.

Another object is to effect improvements in the outboard type of trap by virtue of which it retains the advantages normally possessed by that type, but with additional advantages heretofore possessed only by the inboard type, and additional advantages approaching more closely the ideal intended operation of both types of traps.

As stated, features of my invention are applicable to either inboard or outboard traps. However, to avoid surplusage in illustration and description and because I now prefer the outboard type, the present disclosure will be restricted to a disclosure of my invention as applied to a trap of that type; it being understood that the invention is to apply, within the scope of one or more of the appended claims, also to the inboard type, particularly since anyone of average skill in the art will be able to apply the invention to the inboard type after having read the following disclosure of the invention as applied to the outboard type. It will also be understood, of course, that the invention is not to be limited to the exact details shown.

In the drawing, which is a sectional elevation of a trap built in accordance with my invention, the body portion 10 and the bonnet 11, screw-threadedly engaged with the body portion and thereto readily attachable to and detachable from the body portion, constitute the casing of the trap. The body portion 10 is provided with a screw-threaded outlet opening 12 adapted to receive the threaded end of the return pipe (not shown). The body portion 10 is provided also with a spud or tailpiece 13, recessed thereto by a union nut 14, and adapted to be connected to the outlet of the radiator (not shown) to which the trap is to be applied. When the valve presently to be described is open, fluid may enter the trap from the radiator through the inlet port 15 and be discharged through the outlet 12. Except for the inlet opening or port 15 (sometimes open and at other times closed) and the outlet port 12, the trap is sealed and fluid-tight.

The interior of the trap is divided into two chambers 16 and 17 by a septum or partition 18 constructed of metal (or if desired of suitable heat insulating material) and suitably secured to the body portion 10 of the trap. The thermostat 19, of the capsule type containing volatile liquid 20, is located in the chamber 17; being adjustably secured to the bonnet 11 and provided with a shank 21 terminating in a valve head or valve 22. The valve 22 is engaged with and disengaged from the valve seat 23 by the thermostat 19 in its expansible and contractible movements.

It will be noted that the valve shank 21 extends through an opening 24 in the partition 18. This opening 24 is made of such size as to provide such suitable clearance around the shank as will provide a communicating port for the passage of steam and/or air (i. e. elastic fluid) from one of the chambers 16, 17, into the other of these chambers.

The partition 18 is cut-away at its lower portion at 25, so as also to permit communication between the chambers 16 and 17 around the bottom of the partition, this port so constituted being sometimes closed by the liquid seal formed by the collection of condensate 26 in pocket in the lower portion of the trap. The chamber 17 communicates at all times with the chamber 16 through the port 24 and sometimes through the lower port (under the edge 25 of the partition 18) when the liquid seal 26 is broken; but the chamber 17 is otherwise sealed.

The theoretically ideal automatic operation of the valve is that when air and/or condensate is or are present in the radiator and the port 15, the valve 22 shall be automatically opened (i. e. moved away from the seat 23) by the thermostate 19 to permit immediate, rapid and complete venting of the air and/or condensate in the radiator and the port 15, and that when no air or condensate, but only steam, is present, the valve 22 shall be automatically closed (i. e. moved into and held in engagement with the seat 23) by the thermostat 19. While this absolutely ideal operation is not attained, nevertheless it is quite substantially and practically approached with my invention; the operation, as I now understand it, being substantially as follows:

When steam is first turned on to the radiator or heater to which the trap is attached, air and condensate are first expelled, shortly followed by steam, the valve 23—22 at this time being open. There is somewhat of a lag in the closing of the valve due to the fact that in order to engage and operate the thermostat the steam must pass through the orifice 24, also due to the fact that the partition introduces an insulating effect, and also to the thermostatic characteristics of the fluid 20 within the capsule 19. This lag, so produced, is quite effective in permitting air to escape from the radiator. Steam, together with hot condensate, entering the trap through the valve 23—22, being there at a higher pressure than at the outlet port 12, tends to fill the entire space within the trap between the inlet and outlet ports and the hot condensate impinges against the surface of the valve head 22 and is deflected downwardly and back against the (left hand) wall of the trap.

The steam enters the chamber 17 through the port 24 and as the depth or head of the liquid seal 26 is comparatively slight, the condensate is blown out of the liquid seal and the entire chamber 17 becomes filled with steam, causing the volatile liquid 20 in the thermostat to vaporize and expand the thermostat, which starts to close the valve. The steam which substantially entirely fills the chamber 17 is condensed by surface of the body portion 10 and bonnet 11 and the condensate re-establishes the water seal 26. Further condensation of the steam in the chamber 17 causes air, or steam, or both, to enter the chamber 17 through the port 24. If the valve 23—22 is still open and pure steam is entering the trap, the valve 23—22 is closed by the thermostat. If, with the steam, air enters the chamber 17 through the port 24; i. e. air is still being discharged from the radiator, the air tends to settle in the bottom of the chamber 17 and to surround and insulate the lower portion of the thermostat from heat. This causes a gradual condensation of the thermostatic fluid 20 because the chamber 17 is now partly filled with air (in the lower part of the chamber) and partly filled with steam (in the upper part of the chamber). The insulating effect produced by the air causes the thermostat to contract, opening the valve 23—22. If air is still present in the radiator, then more air is drawn into the chamber 17 by the condensation of the residual steam in the upper part of the chamber 17 and the thermostat contracts still further, thereby increasing the opening of the valve 23—22 and the consequent capacity of the trap.

If, following the condensate, steam instead of air is discharged through the valve 23—22, then the pressure of this steam together with the suction effect of the residual steam in the upper part of the chamber 17 tends to hold the thermostat in balance. If the thermostat 19 contracts, the pressure in the chamber 16 progressively increases and is communicated through the orifice 24 into the chamber 17, causing the liquid seal 26 to be blown out. The chamber 17 thereupon becomes filled with steam and the thermostat expands again closing the valve.

Due to the provision of the partition 18, the restricted orifice 24, and the liquid seal 26, a condition of calm is produced within the chamber 17 as compared to the turbulence within the chamber 16. This condition of calm within the chamber 17 facilitates the rapid segregation and stratification of any air and steam in this chamber, the air settling to the bottom and the steam rising to the top. This causes an operation of the thermostat that is gradual, progressive, and smooth, in direct proportion to the varying relationship between the quantity of air and the quantity of steam in the chamber 17. The result is a quite accurate automatic action of the valve 23—22 in its functioning.

If, for example, the thermostat is so designed and adjusted as to close the valve at 212° F., condensate at a higher temperature may nevertheless be discharged into the chamber 16 through the valve, due to the insulating effect of the partition 18. This insulating effect may be enhanced, as desired, by making the partition of some considerable thickness or by building it as a double wall with an air insulating chamber or pocket within it.

It will be understood, of course, that any condensate entering the chamber 16 drops by gravity therefrom through the discharge port 12.

What I claim is:

1. A return trap comprising, in combination, a casing having an inlet port adapted to receive steam, air, and condensate, and an outlet port adapted to discharge air and condensate to a return pipe, a valve within said casing and controlling communication between said ports, said casing having two chambers, one of said chambers having direct communication with the inlet and outlet ports, a thermostat in the other of said chambers and connected to said valve for operating it, a port connecting said chambers for admitting elastic fluid from the first mentioned chamber to the second mentioned chamber containing the thermostat, and a liquid seal port also connecting said chambers.

2. A return trap comprising, in combination, a casing, a partition dividing the interior of said casing into two chambers, one of said chambers having an inlet port adapted to receive air, condensate, and/or steam, and an outlet port and a valve located therein and controlling communication between said inlet and outlet ports, a thermostat mounted in the other of said chambers and operatively connected to said valve, the partition having an orifice for conveying elastic fluid from the first into the second chamber, and a liquid seal port connecting the chambers.

3. A return trap for steam radiators comprising, in combination, a casing having two chambers, one of said chambers having an inlet port adapted to receive the discharge from a radiator and an outlet port adapted to discharge into a return pipe, a thermostat mounted in the other of said chambers, and a valve controlled by the thermostat and controlling communication between said inlet port and first mentioned chamber; the said chambers being at all times in restricted communication with each other whereby elastic fluid is admitted to the chamber containing the thermostat whenever elastic fluid is present in the other chamber and under greater pressure than the pressure in said chamber containing the thermostat.

4. A return trap for steam radiators comprising, in combination, a casing having two chambers, one of said chambers having an inlet port adapted to receive the discharge from a radiator and an outlet port in continuous communication with said last mentioned chamber adapted to discharge into a return pipe, a thermostat mounted in the other of said chambers, and a valve controlled by the thermostat and controlling communication between said ports; the said chambers being in restricted communication with each other.

5. A return trap as set forth in claim 4 and having provisions for preventing condensate discharged from the radiator into one of the chambers from entering the other chamber containing the thermostat.

6. A return trap for steam radiators comprising in combination a casing having two chambers, one of said chambers having an inlet port adapted to receive the discharge from a radiator and an outlet port adapted to discharge into a return pipe, the outlet port always in open and free communication with one of the two chambers, a thermostat mounted in the other of said chambers, and a valve controlled by the thermostat and controlling communication between said ports, the said chambers being in restricted communication with each other.

In testimony whereof I hereto affix my signature.

ALFRED L. BROWNE.